July 8, 1947. I. B. POLEVITZKY Re. 22,896

ILLUMINATING DEVICE

Original Filed Nov. 14, 1945 2 Sheets-Sheet 1

Inventor

Igor B. Polevitzky,

By I. R. Paris

Attorney

July 8, 1947. I. B. POLEVITZKY Re. 22,896

ILLUMINATING DEVICE

Original Filed Nov. 14, 1945 2 Sheets-Sheet 2

Inventor

Igor B. Polevitzky,

By I. R. Paris

Attorney

Reissued July 8, 1947

Re. 22,896

UNITED STATES PATENT OFFICE 22,896

ILLUMINATING DEVICE

Igor B. Polevitzky, Miami, Fla.

Original No. 2,405,518 dated August 6, 1946, Serial No. 628,516, November 14, 1945. Application for reissue December 31, 1946, Serial No. 719,372

10 Claims. (Cl. 176—122)

The present invention relates generally to illuminating devices of the gaseous discharge type. The invention may be applied to the several types of discharge lamps which employ any gas or vapor which will support an electric discharge and serve as a source of illumination, such as mercury vapor, neon or argon or other gases.

The main object of the present invention is to provide a lamp of this type, in which illumination is obtained from a relatively large area. In the present invention, therefore, the body of illuminating gas is disposed over a relatively large area, being confined substantially between a pair of confining disks. For the purpose of providing relatively narrow discharge paths between the electrodes employed in the space, the space is partitioned in such a manner that it forms one or more labyrinthine passage. In the present invention, therefore, the discharge electrodes are disposed at the ends of the labyrinthine passages and the latter serve as the path for the illuminating discharge.

Another aim of the present invention is to provide a plurality of such labyrinthine passages in the relatively flat space, these several passages forming several paths, which cooperate to yield a large area source of illumination.

Another object of the present invention is to provide an illuminating device of the type described in which the several discharge paths are inter-leaved or inter-related in a manner as to give the effect of a single source of illumination.

A still further object of the present invention is to provide an illuminating device of the type described and in which the current in some of the passages is caused to lag or lead with reference to the current in other passages, thereby substantially eliminating any flicker effect and rendering the illumination substantially uniform.

Another object of the present invention is to provide a fluorescent lamp in which the fluorescent material is activated by a gaseous discharge through one or more sinuous or labyrinthine passages, thereby providing an area source of illumination with the entire area emitting light uniformly.

Other objects and advantages of the present invention will be understood by persons skilled in the art by reference to the accompanying drawings and the following specification and description thereof; it being understood that these are illustrative of the present invention and that variations thereof will be apparent to persons skilled in the art.

Figure 1:
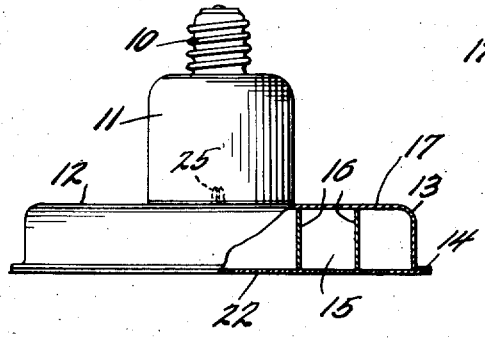
Fig. 1 is a side view of a lamp embodying the present invention, a portion of the illuminating unit being broken away to provide a side view of the partitions.

Referring to the drawings, it will be seen that the present illuminating device comprises a standard screw base 10, a housing 11 which contains the auxiliary equipment and the illuminating unit 12. The illuminating unit 12 comprises a cup-shaped receptacle 13 having an outward flange 14. This cup-shaped element 13 may be of any suitable material such as glass molded ceramic or any suitable plastic or stamped metal or the like. The space within the cup-shaped container 13 is in the form shown in Fig. 2 partitioned into a single labyrinthine passage 15 by means of the single spiral partition 16, which extends from the center of the chamber to its side wall. The partition 16 like the container 13 may be made of any suitable material, and preferably of the same material as the container.

Figure 2:
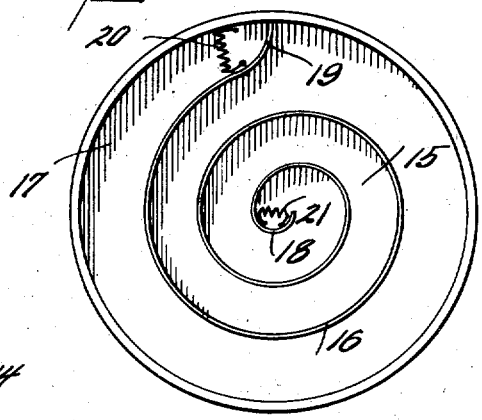
Fig. 2 is a plan view of the illuminating space.

The partition 16 is lodged directly against the bottom 17 of the container 13 and has its inner end 18 shaped in the form of a semi-circle as shown in Fig. 2. The other end of the spiral partition is curved as shown at 19 and abuts against the side wall of the container 13.

The electrode filaments 20 and 21 are mounted as shown at the ends of the labyrinthine passage 15; the electrode 20 being disposed as shown near the curved end 19 of the partition 16, and the electrode 21 being disposed as shown across the curved portion 18 of the wall 16. The electrode filaments may be disposed in a more or less vertical position as shown in Fig. 3.

The cover glass 22 is disposed over the face of the chamber 13 and is sealed by any suitable means to the flange 14 thus providing a hermetically sealed space within the chamber. The partition 16 preferably extends flush with the outer face of the flange 14 and preferably touches the inner face of the glass cover 22.

The inner face of the container 13, the inner face of the glass plate cover 22, as well as the sides of the partition 16 are coated with any suitable fluorescent material. In the process of manufacture the chamber is evacuated and the desired pressure of discharge gas is admitted through the passage 25 which is subsequently sealed. The cover glass 22 will then be subjected to atmospheric pressure which will cause the same to be slightly bowed inwardly and toward the edges of the partition 16.

Figure 3:
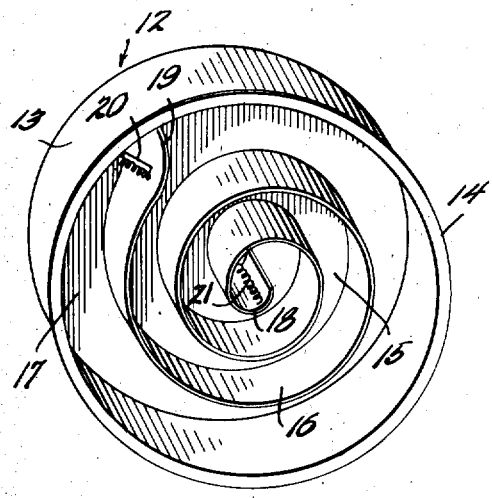
Fig. 3 is a perspective view of the illuminating chamber.
Figure 4:
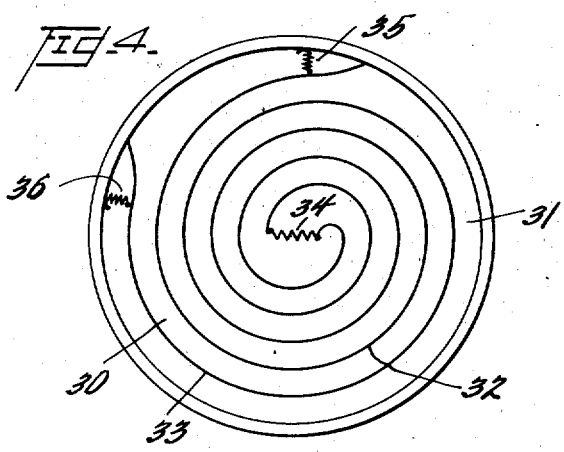
Fig. 4 is a face view of a modification which provides two discharge paths.
Figure 5:
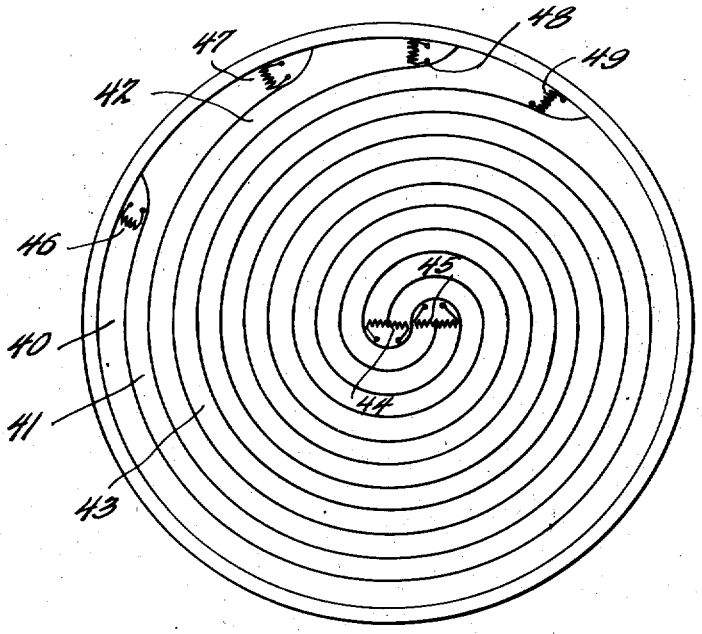
Fig. 5 is another modification which provides four discharge paths.

In the present construction the partition or partitions, whether in the form shown in Figs. 2 and 3 where there is only one partition, or in the forms shown in Figs. 4 and 5 where there are two and four partitions need not be installed in such a manner that the several passages are sealed off from each other. After the partition walls are suitably shaped, it is sufficient to insert or install them in the housing in such a manner that they are not likely to be displaced in ordinary use. For this purpose it will be sufficient to affix one end of each partition against the side wall and the other end against the center of the bottom wall.

The housing and partitions, being coated on the inside surfaces, or on all surfaces exposed to the discharge with the fluorescent material, may be made of metal such as sheet metal or the like. Thus in this construction, the fluorescent material in addition to enhancing the illumination also serves to insulate the metal housing and metal partitions. For this purpose the metal housing and metal partitions are coated with fluorescent insulating enamel.

It will now be understood that when this lamp is put into operation substantially the entire space between the cover glass and the bottom of the unit becomes luminous. This is due to the fact that the discharge passage covers substantially this entire area. This, together with the diffusion effect of the luminous coating further enhances the uniform distribution of illumination over the entire area.

In the form shown in Fig. 4 the structure is substantially identical with that shown in Fig. 1 except that the chamber 13 is divided into two labyrinthine passages 30 and 31 by means of two spiral partitions 32 and 33. A single electrode 34 is disposed at the center of the chamber which serves as an electrode for both passages 30 and 31, and two other electrodes 35 and 36 are disposed at the other end of the passages.

In the form shown in Fig. 5, the space is divided into four labyrinthine passages 40, 41, 42 and 43 by means of four spiral partitions which like the partitions in the other figures extend from approximately the center of the chamber to its side walls by following a spiral curve. A filament electrode 44 at the center of the chamber serves as one electrode for two adjacent discharge paths and the filament electrode 45 also serves as an electrode for the two remaining adjacent discharge paths. At the other end each discharge path is provided with its own electrode 46, 47, 48 and 49.

As in the form shown in Figs. 1, 2 and 3 so in the forms shown in Figs. 4 and 5 the inner face of the container, the partitions and the inner face of the cover glass are all coated with fluorescent or phosphorescent material, with the result that the entire chamber constitutes a large area source of illumination.

Instead of spiral labyrinths, the discharge paths may take any desired sinuous or tortuous path, the essential feature being that such paths cover the entire area of the lamp.

Where the illuminating device has more than one discharge path all paths are of substantially the same length. All paths, therefore, operate under the same conditions and the manufacture and operation of the device is devoid of difficulties.

Any type of ballast and any type of starting switch may be employed in connection with the present invention and in connection with any of the forms shown herein. However, in connection with the forms shown in Figs. 4 and 5 the ballast is of a type so as to give one discharge path a lagging power factor and the other a leading power factor. The result is an overall increase in the power factor of the lamp and a practical elimination of the flicker effect of such lamp. This wiring diagram is schematically illustrated in Fig. 6.

Figure 6:
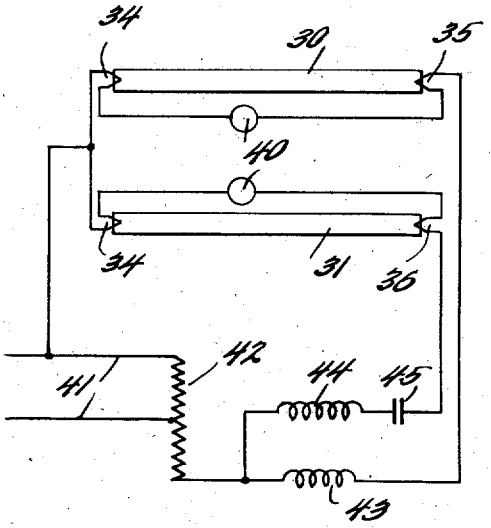
Fig. 6 is a schematic illustration of the wiring diagram.

The two discharge paths 30 and 31 of Fig. 4 are represented in Fig. 6 for purposes of simplicity as straight instead of sinuous. It will be understood also that these paths 30 and 31, as shown in Fig. 6, may also correspond to any pair of paths in the form shown in Fig. 5. The common electrode 34 of Fig. 4 is here shown for purposes of simplicity in two parts, one part in path 30 and the other in path 31. The starting switches 40 are shown connected to the two discharge paths and while shown as individual devices it will be understood that they may be operated in unison. The line wires 41 may be connected to the lamp by means of the split phase device 42. The inductances 43 and 44, together with the condenser 45, as shown, serve to cause one of the discharge paths to lead and the other to lag.

I claim:

1. An illuminating device comprising a flat metal housing, having a substantially flat bottom wall, a coating of fluorescent insulating enamel on the inner faces of said housing, and a substantially flat transparent cover plate parallel to the bottom wall sealed to the metal housing, a fluorescent coating on the inner face of said cover plate, convolute metallic partitions in said housing divided the same into a plurality of spiral passages, all of substantially the same length, each extending from substantially the center to the periphery of the housing and separated from each other by a single wall extending from the bottom wall to the cover plate, said partitions being coated with fluorescent insulating enamel and fixedly connected to the housing only at their end portions, thermionic electrodes mounted in the housing at each end of said passages, lead-ins for the electrodes, and a suitable gas filling said housing and providing a discharge path between opposing electrodes serving as a source of illumination.

2. An illuminating device comprising a flat metal housing, having a substantially flat bottom wall, a coating of insulating enamel on the inner faces of said housing, a substantially flat transparent cover plate parallel to the bottom wall sealed to the metal housing, a fluorescent coating on the inner face of said cover plate, convolute partitions in said housing dividing the same into a plurality of labyrinthine passages, all of substantially the same length, each extending from substantially the center to the periphery of the housing and separated from each other by a single wall extending from the bottom wall to the cover plate, said partitions being coated with insulating enamel, thermionic electrodes mounted in the housing at each end of said passages, lead-ins for the electrodes, and a suitable gas filling said housing and providing a discharge path between opposing electrodes serving as a source of illumination.

3. An illuminating device comprising a metal housing, having a substantially flat bottom wall and a substantially flat transparent cover plate parallel to the bottom wall, a fluorescent coating on the inner face of said cover plate, convolute partitions in said housing, dividing the same into a plurality of spiral passages, all of substantially the same length, each extending from substantially the center to the periphery of the housing and separated from each other by a single wall extending from the bottom wall to the cover plate, said housing and partitions being coated by an insulating enamel, thermionic electrodes mounted in the housing at each end of said passages, lead-ins for the electrodes, and a suitable gas filling said housing and providing a discharge path between opposing electrodes serving as a source of illumination.

4. An illuminating device comprising a sealed flat housing, having a substantially flat bottom wall and a substantially flat transparent cover plate parallel to the bottom wall, a fluorescent coating on the inner face of said cover plate, convolute partitions in said housing dividing the same into a plurality of spiral passages, all of substantially the same length, each extending from substantially the center to the periphery of the housing and separated from each other by a single wall extending from the bottom wall to the cover plate and fixedly attached to the housing only to maintain the same rigidly within the housing without sealing the passages from each other, thermionic electrodes mounted in the housing at each end of said passages, lead-ins for the electrodes, and a suitable gas filling said housing and providing a discharge path between opposing electrodes serving as a source of illumination.

5. An illuminating device comprising a metal housing, having a substantially flat bottom wall and a substantially flat transparent cover plate, a convolute metal partition in said housing providing a spiral passage therein extending from substantially the center to the periphery of the housing, the partition extending from the bottom wall to the cover plate, said housing and partition being coated by an insulating enamel, thermionic electrodes mounted in the housing at each end of said passage, lead-ins for the electrodes, and a suitable gas filling said housing and providing a discharge path therein serving as a source of illumination.

6. An illuminating device comprising a metal housing, having a substantially flat bottom wall and a substantially flat transparent cover plate, a convolute metal partition in said housing providing a spiral passage therein extending from substantially the center to the periphery of the housing, the partition extending from the bottom wall to the cover plate, said housing and partition being coated by a fluorescent insulating enamel, thermionic electrodes mounted in the housing at each end of said passage, lead-ins for the electrodes, and a suitable gas filling said housing and providing a discharge path therein serving as a source of illumination.

7. A device of the class described comprising a metal housing, having a substantially flat bottom wall, a substantially flat transparent cover plate therefor, a metal partition in said housing forming a labyrinthine passage therein coextensive in area substantially with the area of the cover, the partition extending from the bottom wall to the cover plate, said housing and partition being coated with an insulating coating, a thermionic electrode mounted in the housing at each end of the passage, lead-ins for the electrodes, and a suitable gas filling said housing and providing a discharge path therein serving as a source of illumination.

8. A device of the class described comprising a metal housing, a transparent cover plate therefor, a partition in the housing forming a labyrinthine passage therein coextensive in area with the area of the housing, the partition extending from the bottom wall to the cover, said housing and partition being coated with an insulating coating, a thermionic electrode mounted in the housing at each end of the passage, lead-ins for the electrodes, and a suitable gas filling said housing and providing a discharge path therein serving as a source of illumination.

9. A device of the class described comprising a metal housing, a transparent cover plate therefor, a metal partition in the housing forming a spiral passage therein extending from substantially the center to the periphery of the housing, the passage having an area coextensive with the area of the housing, said housing and partition being coated with an insulating coating, a thermionic electrode mounted in the housing at each end of the passage, lead-ins for the electrodes, and a suitable gas filling said housing and providing a discharge path therein serving as a source of illumination.

10. A device of the class described comprising a metal housing, a transparent cover plate therefor, a metal partition in the housing forming a labyrinthine passage therein, the partition extending from the bottom wall to the cover, said housing and partition being coated with an insulating coating, a thermionic electrode mounted in the housing at each end of the passage, lead-ins for the electrodes, and a suitable gas filling said housing and providing a discharge path therein serving as a source of illumination.

IGOR B. POLEVITZKY.

REFERENCES CITED

The following references are of record in the file of this patent:

UNITED STATES PATENTS

| Number | Name | Date |
|---|---|---|
| 2,255,431 | Marden | Sept. 9, 1941 |
| 2,135,732 | Randall | Nov. 8, 1938 |
| 1,004,503 | Troy | Sept. 26, 1911 |
| 1,813,759 | Peters | July 7, 1931 |
| 1,981,903 | Cadieux | Nov. 27, 1934 |
| 1,870,147 | Smally | Aug. 2, 1932 |
| 1,935,423 | Wayringer | Nov. 14, 1933 |
| 1,984,215 | Hotchner | Dec. 11, 1934 |
| 2,298,935 | Freeman | Oct. 13, 1942 |